US005278477A

United States Patent [19]

Hartmann et al.

[11] Patent Number: 5,278,477

[45] Date of Patent: Jan. 11, 1994

[54] DRIVE SYSTEM FOR A PRINTING MACHINE WITH SEVERAL PRINTING UNITS

[75] Inventors: Klaus Hartmann, Schriesheim; Michael Krüger, Edingen-Neckarhausen; Georg Rössler, Angelbachtal, all of Fed. Rep. of Germany

[73] Assignee: Heidelberger Druckmaschinen AG, Heidelberg, Fed. Rep. of Germany

[21] Appl. No.: 871,042

[22] Filed: Apr. 20, 1992

[30] Foreign Application Priority Data

Apr. 20, 1991 [DE] Fed. Rep. of Germany ....... 4113025

[51] Int. Cl.[5] ......................... B41F 13/00; H02P 5/46

[52] U.S. Cl. ...................................... 318/112; 318/59; 318/68; 318/77

[58] Field of Search ........................ 318/34, 45, 49, 53, 318/59, 66, 68, 77, 82, 83, 98, 102, 104, 112

[56] References Cited

U.S. PATENT DOCUMENTS

| | | | |
|---|---|---|---|
| 3,594,552 | 7/1971 | Adamson . | |
| 3,997,828 | 12/1976 | Bottcher et al. | 318/603 |
| 4,260,936 | 4/1981 | Sun | 318/66 |
| 4,419,613 | 12/1983 | Ichinose et al. | 318/632 |
| 4,644,232 | 2/1987 | Nojiri et al. | 318/66 |

FOREIGN PATENT DOCUMENTS 105767 5/1979 German Democratic Rep. .

*Primary Examiner*—Bentsu Ro
*Attorney, Agent, or Firm*—Herbert L. Lerner; Laurence A. Greenberg

[57] ABSTRACT

A drive system for a printing machine with a plurality of printing units connected to one another via a gear train into which power is fed at different points by at least two motors, includes supplying each of the motors via a respective controllable, line-commutated converter. A signal is generated by each of the converters that is limited in time between two firing pulses. A current setpoint value is transferred only within a time span in which all of the converters have activated the signal. Coverage of all of the signals which are limited in time is assured in all operating states.

6 Claims, 2 Drawing Sheets

Fig.3
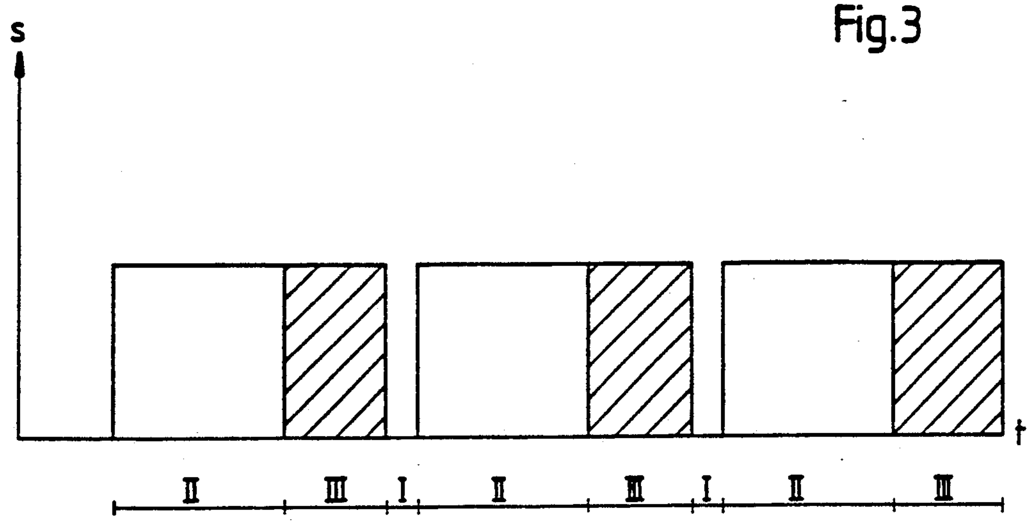
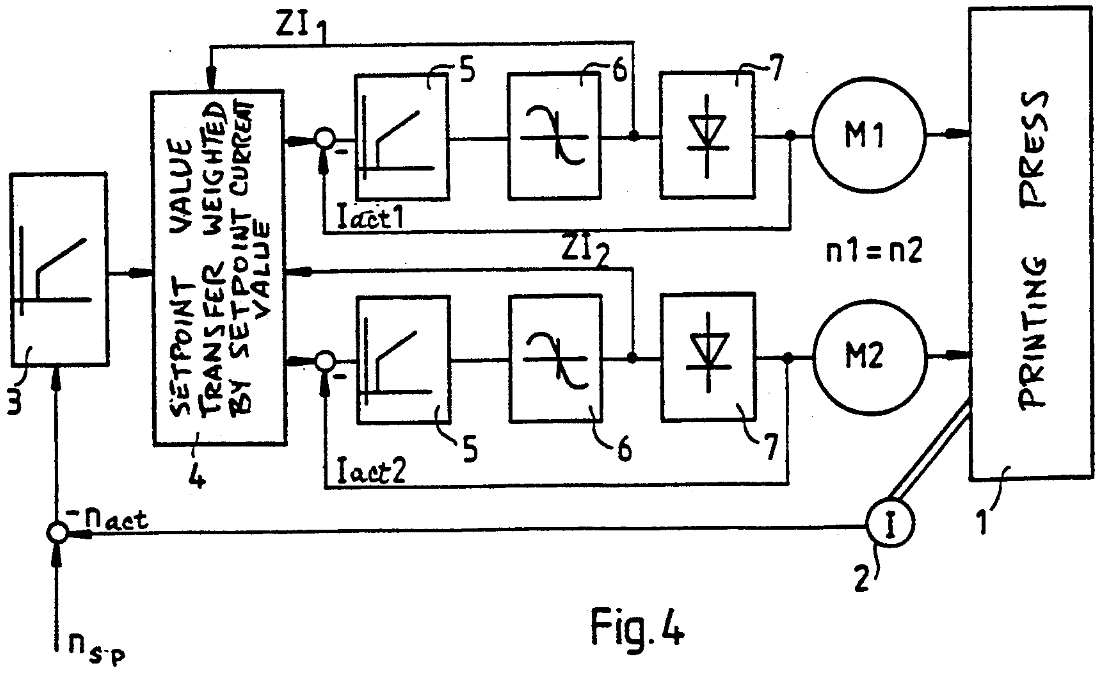
Fig.4

DRIVE SYSTEM FOR A PRINTING MACHINE WITH SEVERAL PRINTING UNITS

The invention relates to a drive system for a printing machine with several printing units which are connected to one another via a gear train into which power is fed at different points by means of at least two motors.

In the printing technology field, most demands are made in the direction of improved rationalization and increased quality. For the production of high-quality printed products which are printed in many colors on both sides and, if necessary or desirable, varnished in one pass through the printing machine, it is necessary, especially in sheet-fed offset printing, to arrange a large number of printing units in tandem. With respect to the mode of operation thereof, these printing units must be harmonized with one another to a high degree.

In order to achieve a reduction in the loading on the gear wheels, multiple drives are usually used on a printing machine with many printing units. In this regard, power is fed into the gear train at different points.

In order to ensure a constant power flow and, therefore, constant tooth-flank or tooth-side contact in the region between the printing units which are supplied by the individual drives, the various drives must feed different power outputs into the gear train. Once a power ratio has been selected, it must be kept constant during the printing process. Changes in the direction of the power flow have a negative effect upon the printing quality: a tooth-flank or tooth-side shift resulting from such a change in the direction of the power flow in the gear train causes uncontrollable twisting of the gear wheels which are considered to be elastic. Low-frequency vibrations are excited thereby which have a negative effect upon the printed products in the form of ghosting or register errors. These printing errors cause a considerable reduction in the printing quality.

From the German Democratic Republic Patent 105 767, a method and a circuit arrangement for the torque-timing adjustment of multiple drives on printing machines with several printing units have become known heretofore wherein each printing unit possesses its own drive. For speed-independent, torque-timing adjustment of the drives, each printing unit of the printing machine is coupled with a direct-current shunt motor having an armature which is connected to a voltage source via individually adjustable armature series resistors. The armature resistors of the individual drives are adjusted in accordance with the desired torque ratio.

It is an object of the invention of the instant application to provide a solution to the technical problem of constructing a multimotor drive for a printing machine which ensures synchronous feeding of torque by the motors into the printing machine.

With the foregoing and other objects in view, there is provided, in accordance with the invention, a drive system for a printing machine with a plurality of printing units connected to one another via a gear train into which power is fed at different points by at least two motors, which comprises supplying each of the motors via a respective controllable, line-commutated converter; generating a signal $t_e$ limited in time by each of the converters between two firing pulses; and transferring a current setpoint value only within a time span in which all of the converter have activated the signal $t_e$, coverage of all of the signals $t_e$, which are limited in time, being assured in all operating states.

In accordance with another feature of the invention, the drive system comprises generating the signal limited in time by each of the converters when a firing pulse occurs.

In accordance with a further feature of the invention, the drive system comprises maintaining in actuated condition the signal limited in time generated by one of the converters at most until a following firing pulse occurs.

In accordance with an added feature of the invention, the drive system comprises, with a six-pulse, line-commutated converter maintaining activation of the signal for 400 μsec from the time the preceding firing pulse occurs. In practice, with a line frequency of 50 Hz, this time span of 400 μsec has proven to be sufficient to ensure reliable setpoint-value transfer between firing pulses occurring every 3.3 msec.

In accordance with an additional feature of the invention, the converter is a digital converter, and which further comprises feeding to the digital converter current setpoint values from a higher-level digital speed controller via a parallel or serial interface. The use of digital converters offers the advantage that a control system which is markedly drift and tolerance free can be achieved. In addition, the use of digital converters opens up the possibility, via the current regulating circuit, of compensating for differences with regard to dynamic response in the case of motors which do not have like construction.

In accordance with yet another and special feature of the system according to the invention, the following occurs: switching with each converter a monostable flip-flop having a holding time $t_e$ into the astable state, each time a firing pulse occurs; leading the output signals of the monostable flip-flops to an AND gate; and transferring a current setpoint value only when all of the monostable flip-flops are in the astable state. The use of monostable flip-flops to generate signals of given duration is a very inexpensive solution. Because the time during which a switched monostable flip-flop remains in the astable state is proportional to the resistance and the capacitance of the circuit, the duration of the astable state can be varied over a wide range by appropriate dimensioning.

With the objects of the invention in view, there is also provided a drive for a printing machine with a plurality of printing units connected to one another via a gear train into which power is fed at different points by at least two motors, comprising respective controllable line-commutated converters connected to the motors for supplying the motors, the converter having means for generating a signal limited in time between two firing pulses; and means for transferring a current setpoint value only within a time span wherein all of the converters have activated the signal, coverage of all of the signals limited in time being assured in all operating states.

In accordance with yet an additional feature of the invention, the converters are six-pulse, line-commutated converters wherein activation of the signal is maintainable for 400 μsec after a first of the two firing pulses has occurred.

In accordance with yet an added feature of the invention, the converters are digital converters connected via a parallel or serial interface with a higher-level digital speed controller for receiving current setpoint values therefrom.

In accordance with a concomitant feature of the invention, there is provided a respective monostable flip-flop having a holding time $t_e$ connected to each of the converters and switchable thereby into astable state upon the occurrence of every firing pulse; an AND gate connected to the monostable flip-flops for receiving output signals thereof; and means for transferring a current setpoint value only when all of the monostable flip-flops ar in astable state.

Other features which are considered as characteristic for the invention are set forth in the appended claims.

Although the invention is illustrated and described herein as embodied in a DRIVE SYSTEM FOR A PRINTING MACHINE WITH SEVERAL PRINTING UNITS, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 3 is a plot diagram of the time rate of change of the output signal of the circuit arrangement shown in FIG. 2; and FIG. 4 is a circuit diagram for synchronization of the motors, in accordance with the invention.

Figure 1:
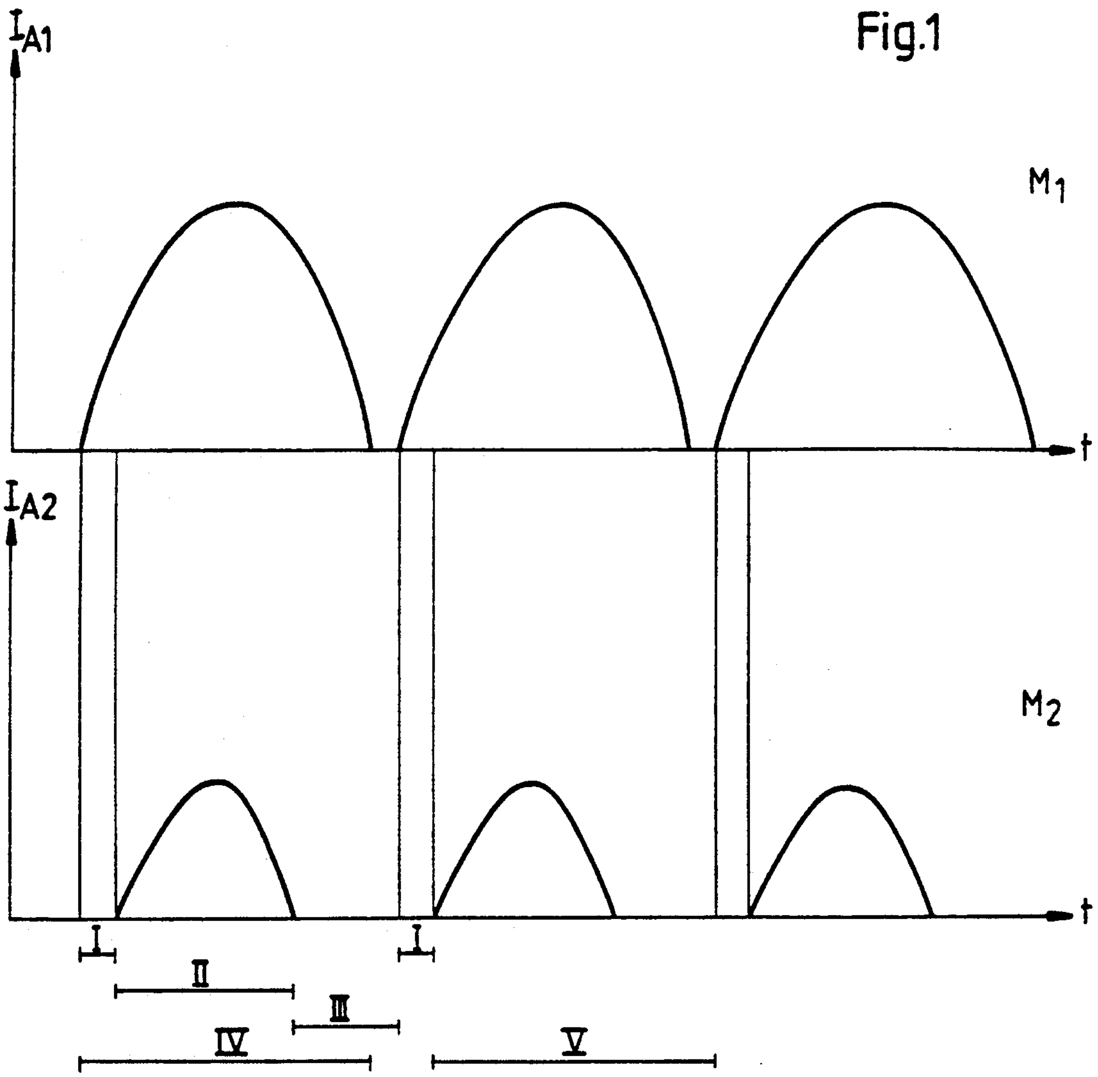
FIG. 1 are plot diagrams showing the time rate of change of the armature current of two motors for driving a printing machine.

Referring now to the drawings and, first, particularly to FIG. 1 thereof, there are shown therein plot diagrams which depict the change in time of the armature currents $I_{A1}$ and $I_{A2}$, respectively, of two motors $M_1$ and $M_2$ for driving a printing machine. Feeding different currents into the motors $M_1$ and $M_2$ takes into account that a constant tooth-side contact in the gear train of the printing machine is assured only when torques of different magnitudes are introduced into the gear train via the individual in-feed points.

Converters $SR_1$ and $SR_2$ (note FIG. 2) receive their firing pulses $ZI_1$ and $ZI_2$, respectively, from the electronic control unit of the converters $SR_1$ and $SR_2$. Although both converters $SR_1$ and $SR_2$ generate line-commutated firing pulses $ZI_1$ and $ZI_2$, respectively, the position of their actual firing points usually differs slightly. The cause thereof is apparent in the different setpoint values for the armature currents $I_{A1}$ and $I_{A2}$. However, even with identical setpoint values for the armature currents $I_{A1}$ and $I_{A2}$, it is not possible to completely exclude such shifting of the firing points from the ideal firing points as defined for the motor and the load by the mains supply. Even when the motors $M_1$ and $M_2$ are of identical construction, differences in the control-circuit parameters occur: permitted component tolerances lead to different actual values for the armature currents $I_{A1}$ and $I_{A2}$ and to different dynamic responses of the current-regulating circuit. If a sudden variation in the current setpoint value occurs within the time ranges I, the converter $SR_2$ which drives the motor $M_2$, and has not yet been fired, responds within the actual firing period IV. Because the converter $SR_1$ has already been fired within the time range I, the converter $SR_1$ drives the motor $M_1$, does not respond to this sudden variation in the current setpoint value until the next firing period V. Accordingly, the constancy of the torque ratio of the individual motors $M_1$ and $M_2$ of the printing-machine drive is disturbed, which would have negative effects on the print quality, as noted hereinbefore.

Figure 2:
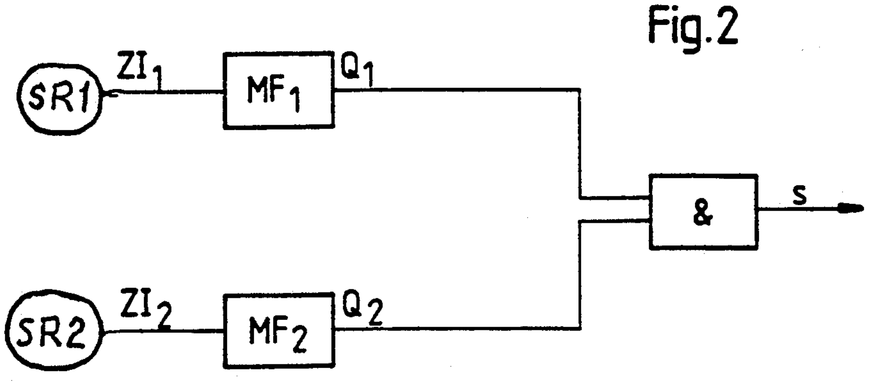
FIG. 2 is a circuit arrangement for synchronous feeding of the motor currents.

FIG. 2 shows a circuit arrangement for the synchronous feeding of torque, via the two motors $M_1$ and $M_2$, into the gear train of a printing machine. The firing pulses $ZI_1$ and $ZI_2$, possibly displaced in time, switch monostable flip flops $MF_1$ and $MF_2$, respectively, with a corresponding time displacement, into astable state. Output signals $Q_1$ and $Q_2$ of both monostable flip-flops $MF_1$ and $MF_2$, respectively, are led to an AND gate. Transfer of the current setpoint values to the motors $M_1$ and $M_2$ is only permitted within the time span in which both monostable flips-flops $MF_1$ and $MF_2$ are switched into the astable state. After a holding time $t_e$ defined by the dimensioning of the monostable flip-flops $MF_1$ and $MF_2$, each of the monostable flip-flops $MF_1$ and $MF_2$ passes again into its stable state, i.e., the transfer of the current setpoint values to the motors $M_1$ and $M_2$ is blocked or inhibited.

FIG. 3 is a plot diagram showing the variation over time of the output signal of the AND circuit according to FIG. 2. A setpoint-value transfer to the individual motors $M_1$ and $M_2$ occurs only within the time span II. Within the time span I, setpoint-value transfer is not permitted. As described hereinbefore, it has proven to be fully sufficient to select, for the monostable flip-flops $MF_1$ and $MF_2$, a holding time $t_e$ of an order of magnitude of 400 μsec. In spite of the different armature currents $I_{A1}$ and $I_{A2}$, the firing points lie relatively close to one another because, especially for driving printing machines, the following boundary conditions are always fulfilled: identical operating speed, identical rated speed, identical load distribution at different speeds, almost identical temperature and environmental operating conditions, and identical frequency-response and voltage ratios for the line-commutated converters. During the minimum time span II, in which both monostable flip-flops $MF_1$ and $MF_2$ are switched into the astable state, assurance is provided that the firing point mainly depends upon the speed and the line voltage, and less upon the armature current $I_{A1}$ and $I_{A2}$.

FIG. 4 is a circuit diagram for the synchronization of the motors, in accordance with the invention. The motors $M_1$ and $M_2$ feed different power outputs, at two different points, into the gear train of the printing machine 1. A speed sensor 2, for example an incremental encoder, which is positioned on the shaft of a single revolution cylinder of the printing machine 1, determines the instantaneous actual speed value $n_{act}$. A variation occurring between the instantaneous actual speed value $n_{act}$ and a preset setpoint or nominal speed value $n_{sp}$ is fed to a speed controller 3. An output signal of the speed controller 3 serves as a current setpoint value $I_{A1}$, $I_{A2}$ for the current regulation subordinated to the speed control. Thus, at 4, the setpoint value transfer is weighted by the setpoint current value because in order to achieve a steady force flow of the printing units driven by the two motors $M_1$ and $M_2$, the setpoint current values are not equal for both motors but rather have a constant ratio to one another different from one. The current regulation per se is effected via a current regulator 5 and trigger equipment 6. The actual current value $I_{act1}$, $I_{act2}$ is determined in the respective energized phase winding of the motors $M_1$ and $M_2$, following a rectifier or inverter 7 for controlling the phase windings of the motors $M_1$ and $M_2$.

According to the circuit arrangement for the synchronous feeding of the motor currents shown in FIG. 2, a setpointvalue transfer occurs only when assurance is provided that both motors $M_1$ and $M_2$ respond to the new current setpoint $I_{A1}$, $I_{A2}$ within the same firing period. In this regard, each of the converters $SR_1$ and $SR_2$ generates a signal $t_e$, which is limited in time, between two successive firing pulses $ZI_1$ and $ZI_2$. Transfer of the current setpoint values $I_{A1}$ and $I_{A2}$ occurs within a time span in which all of the converters have activated the signal $t_e$, assurance having necessarily been provided that coverage of the time-limited signals is possible in all operating states.

We claim:

1. A drive for a printing machine with a plurality of printing units connected to one another via a gear train into which mechanical power is fed at different points by at least two motors, comprising respective controllable line-commutated converters connected to the motors for supplying current to the motors, said converter having means for generating a holding time signal limited in time between two firing pulses; and means for transferring a current setpoint value only within a time span wherein all of said converters have activated said signal, coverage of all of said signals limited in time being assured in all operating states.

2. The drive for a printing machine according to claim 1, wherein each of said generating means is enabled to generate the signal limited in time when a firing pulse occurs.

3. The drive for a printing machine according to claim 2, which further comprises means for maintaining in active condition the signal limited in time generated by one of said converters until a following firing pulse occurs.

4. The drive for a printing machine according to claim 1, wherein said converters are six-pulse, line-commutated converters wherein activation of said signal is maintainable for 400 μsec after a first of said two firing pulses has occurred.

5. The drive for a printing machine according to claim 1, wherein said converters are digital converters connected via a parallel or serial interface with a higher-level digital speed controller for receiving current setpoint values therefrom.

6. The drive for a printing machine according to claim 1, further comprises a respective monostable flip-flop having a holding time $t_e$ connected to each of said converters and switchable thereby into an astable state upon the occurrence of every firing pulse; an AND gate connected to said monostable flip-flops for receiving output signals thereof; and wherein said means for transferring a current setpoint value transfers said current setpoint value only when all of said monostable flip-flops are in the astable state.

* * * * *